United States Patent
Linnamäki et al.

(10) Patent No.: US 9,531,785 B1
(45) Date of Patent: Dec. 27, 2016

(54) AD HOC INJECTION OF IMAP OBJECTS

(71) Applicant: OX Software GmbH, Monheim (DE)

(72) Inventors: Mikko Linnamäki, Stuttgart (DE); Timo Sirainen, Espoo (FI); Peter Hoebel, Bad Woerishofen (DE)

(73) Assignee: OX SOFTWARE GMBH, Monheim (DE)

( * ) Notice: Subject to any disclaimer, the term of this patent is extended or adjusted under 35 U.S.C. 154(b) by 0 days.

(21) Appl. No.: 15/184,746

(22) Filed: Jun. 16, 2016

(51) Int. Cl.
G06F 15/16 (2006.01)
H04L 29/08 (2006.01)
H04L 12/58 (2006.01)
H04W 84/18 (2009.01)

(52) U.S. Cl.
CPC .............. *H04L 67/02* (2013.01); *H04L 51/08* (2013.01); *H04L 51/18* (2013.01); *H04L 51/22* (2013.01); *H04L 67/30* (2013.01); *H04W 84/18* (2013.01)

(58) Field of Classification Search
None
See application file for complete search history.

(56) References Cited

U.S. PATENT DOCUMENTS

| | | | | |
|---|---|---|---|---|
| 6,920,502 B2 * | 7/2005 | Araujo | ................... | H04L 29/06 709/219 |
| 7,155,725 B1 * | 12/2006 | Kister | ................. | G06Q 10/107 719/310 |
| 7,162,513 B1 * | 1/2007 | Kister | ................. | G06Q 10/107 709/203 |
| 8,407,298 B2 * | 3/2013 | Kamat | ................. | H04L 12/587 455/412.1 |
| 8,572,185 B2 * | 10/2013 | Williams | .............. | H04L 12/587 709/206 |
| 8,606,860 B2 * | 12/2013 | Chang | ................. | G06Q 10/107 709/206 |
| 9,166,941 B2 * | 10/2015 | Glickstein | ........... | H04L 67/1095 |
| 9,215,200 B2 * | 12/2015 | Ordogh | ................... | H04L 51/22 |
| 2001/0047406 A1 * | 11/2001 | Araujo | .................... | H04L 29/06 709/223 |
| 2005/0080861 A1 * | 4/2005 | Daniell | ............... | G06Q 10/107 709/206 |
| 2006/0168059 A1 * | 7/2006 | Chang | ................. | G06Q 10/107 709/206 |
| 2008/0256202 A1 * | 10/2008 | Williams | .............. | H04L 12/587 709/206 |
| 2008/0256204 A1 * | 10/2008 | Kamat | ................. | H04L 12/587 709/206 |

(Continued)

*Primary Examiner* — Ranodhi Serrao
(74) *Attorney, Agent, or Firm* — Maschoff Brennan (57) ABSTRACT

Some embodiments include a method to inject ad-hoc IMAP objects into results of IMAP commands. These IMAP objects may appear in the inbox or in any other IMAP user folder of a user on any IMAP capable device, and may feel like an Email to the user, although the IMAP objects were never sent over an SMTP server or protocol. Information that is stored in these IMAP objects can include advertising, promotions, service alerts or any other content. When a MAIL client requests a list of emails for an IMAP user folder from the IMAP server, the IMAP server will ad-hoc inject IMAP objects into the result list. The rules that define which objects are to be injected and in which schedule and to which target persons and the position of them in the result list may depend on object- and/or user-profiles and other targeting parameters.

17 Claims, 7 Drawing Sheets

(56) References Cited

U.S. PATENT DOCUMENTS

| | | | | |
|---|---|---|---|---|
| 2008/0270548 A1* | 10/2008 | Glickstein | ............ | G06Q 10/107 709/206 |
| 2011/0125860 A1* | 5/2011 | Bao | .................... | H04L 12/5835 709/206 |
| 2013/0138755 A1* | 5/2013 | Lu | ........................... | H04L 51/00 709/206 |
| 2014/0172993 A1* | 6/2014 | Ordogh | .................. | H04L 51/36 709/206 |
| 2016/0147782 A1* | 5/2016 | Roseman | .......... | G06F 17/30557 707/822 |

* cited by examiner

AD HOC INJECTION OF IMAP OBJECTS

FIELD

Some embodiments described herein generally relate to ad hoc injection of Internet Message Access Protocol (IMAP) objects into IMAP folder content lists.

BACKGROUND

Unless otherwise indicated herein, the materials described herein are not prior art to the claims in the present application and are not admitted to be prior art by inclusion in this section.

Currently, IMAP servers collect a list of emails for a given user id and IMAP folder depending on the emails which the user has received via simple mail transfer protocol (SMTP)/local mail transfer protocol (LMTP). There is no known mechanism to insert additional information into the email list other than by sending the additional information as an email to the IMAP server. Therefore, advertising, or other informational emails, like alerts for example, must be sent to as emails to a list of named recipients to be distributed and can easily be identified and removed by spam filters and reads/deletions are not easy to recognize for logging.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some embodiments described herein include methods to inject IMAP objects in various IMAP folders of any user of an IMAP server. Any user interaction with this content (e.g. reading, moving, deleting) can be logged in a log file for further analysis and processed analytically. Although the objects are injected only temporarily by the IMAP server and never stored in any email folder physically, the "seen" and "deleted" flags of these entries may be saved by the IMAP server so that the emails behave like normal emails in the IMAP folder. Profile data may be used to select which IMAP objects should be injected.

In an example embodiment, a method to temporarily inject IMAP objects into one or more IMAP folders corresponding to one or more users, using a special IMAP server capability, is described. The method includes storing each of the IMAP objects in corresponding data containers without storing the IMAP objects in any of the one or more IMAP folders. The method also includes temporarily injecting a particular one of the IMAP objects into each of the one or more IMAP folders by temporarily inserting, in response to one or more FETCH commands received from one or more MAIL clients, metadata of the particular one of the IMAP objects into each of one or more IMAP folder content lists of the one or more IMAP folders without storing the particular one of the IMAP objects itself in any of the one or more IMAP folders.

In another example embodiment, a method includes receiving, from a client device associated with a given user of multiple users, a request for an IMAP folder content list of an IMAP user folder of the given user. The method may also include determining whether to inject any of multiple IMAP objects into the IMAP folder content list of the given user. The method may also include, in response to determining to inject a given IMAP object of the multiple IMAP objects into the IMAP folder content list of the given user, injecting the given IMAP object into the IMAP folder content list of the given user by inserting metadata of the given IMAP object into the IMAP folder content list of the given user without storing the given IMAP object itself in the given user's IMAP user folder. The method may also include sending to the client device of the given user the IMAP folder content list that includes the injected given IMAP object.

Additional features and advantages of the disclosure will be set forth in the description which follows, and in part will be obvious from the description, or may be learned by the practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth hereinafter.

BRIEF DESCRIPTION OF THE DRAWINGS

To further clarify the above and other advantages and features of the present disclosure, a more particular description of the disclosure will be rendered by reference to specific embodiments thereof which are illustrated in the appended drawings. It is appreciated that these drawings depict only typical embodiments of the disclosure and are therefore not to be considered limiting of its scope. The disclosure will be described and explained with additional specificity and detail through the use of the accompanying drawings in which:

FIG. 6 is a diagram that depicts how injectable IMAP objects, which are not stored in a user's INBOX, can be injected ad-hoc as a user logs in;

DETAILED DESCRIPTION OF SOME EXAMPLE EMBODIMENTS

Some embodiments described herein generally relate to a system and method to inject IMAP objects ad hoc into IMAP folders. The described embodiments may inject the same IMAP object into many users' mailboxes in an efficient way, e.g., by saving the IMAP object in one location and inserting a pointer to the same IMAP object into each of the user's mailboxes without inserting or saving the IMAP object itself in the users' mailboxes. In these and other embodiments, when a client device of the user logs in to an IMAP server or otherwise requests the user's IMAP folder (or more particularly, an IMAP folder content list) from the IMAP server, the IMAP server may check a profile database and verify which IMAP objects are active for that user, followed by creating on the fly personalized messages for the IMAP objects to inject into the user's IMAP folder. Each IMAP object may include an advertisement message such as a promotion, an informational message such as an alert, or other content.

Each IMAP object may include a template to allow creation of the personalized messages from the IMAP objects using user-specific information collected from an appropriate source. Templates can include one or more of name, age, or other user-specific information.

In comparison to distributing advertisements, alerts, or other content as IMAP objects according to some embodiments described herein, distributing the foregoing as emails over Simple Mail Transfer Protocol (SMTP) is inefficient, and does not work at login time. Distributing emails over SMTP is inefficient because it requires network bandwidth to send each email to each of N recipients and it requires storage to store N different copies of each email. The embodiments described herein are much more efficient because they do not require any bandwidth to send the advertisements, alerts, or other content (since they are not sent as emails) nor do they require storage of N different copies of each advertisement, alert, or other content. Accordingly, the embodiments described herein result in significant improvements in computer systems in which they are implemented, including significant reductions in network bandwidth consumption and storage consumption compared to systems that send advertisements, alerts, or other content as emails. IMAP object injection may be a very efficient way to distribute and sync information to any user of an Email service, and due to the single-object storage (e.g., storing each IMAP object only once without storing it in each user's IMAP user folder), it does not increase the storage capacity more than the single IMAP object, which may include a template and/or which normally may be between 150 kilobytes (kB) and 1 megabyte (MB) of size.

To display a user's list of emails in an IMAP folder of the user, a MAIL client on a client device of the user sends a request to the IMAP server for the list of emails in the IMAP folder, which may be referred to as an IMAP folder content list. The request may be implemented as a FETCH command according to the IMAP protocol and may include a user identifier (ID) that uniquely identifies the user. In response to the request, the IMAP server may collect the list of all emails for the user ID and IMAP folder and may prepare the list to be sent to the MAIL client. Prior to sending the list to the MAIL client, the IMAP server can inject one or more additional IMAP objects into the list. In some embodiments, the injected IMAP objects are handled by the MAIL client as any other emails and cannot be distinguished (at least by the MAIL client) from regular emails.

The position of the emails and other objects in the IMAP folder may be determined based on a date field of each of the emails or other objects. According to the IMAP protocol, the date field may be referred to as the IMAP INTERNAL DATE. The date field or IMAP INTERNAL DATE can be manipulated by the IMAP server in the case of injected IMAP objects to keep the injected IMAP objects on top of the IMAP folder, or at any other position within the IMAP folder. It is possible to update the date field or IMAP INTERNAL DATE or other data associated with each injected IMAP object on any folder update request from the MAIL client. This makes it possible for the IMAP server to position an injected IMAP object on top of the users IMAP folder or at any other position within the IMAP folder, whenever the MAIL client refreshes the IMAP folder content list.

In other embodiments, the position of the emails and other objects in the IMAP folder may be determined based on other criteria, such as message UID, content of FROM field, content of TO field, content of SUBJECT field, or other criteria. Whichever criteria is used, the corresponding field may be modified by the IMAP server in response to each folder update request from the MAIL client to position an injected IMAP object at any desired position (e.g., top of list, 10th position, etc.) within the IMAP folder content list.

Which IMAP object or objects is or are injected into the IMAP folder content list may depend on IMAP user profiles, IMAP object profiles, or other data. IMAP user profiles may include demographic information and/or other information about or specific to a corresponding user. For instance, an IMAP user profile of each user may include information that specifies one or more of a birthdate, age, gender, geographic location (hereinafter geolocation), marital status, race, ethnicity, nationality, sexual preference, religion, job, interests, hobbies, buying habits, or other information about or specific to the user.

IMAP object profiles may include information about or specific to a corresponding IMAP object. For instance, an IMAP object profile of an IMAP object may include information that specifies one or more of a target demographic, campaign duration, or other information about or specific to the IMAP object. The target demographic may include one or more of a target age group, target gender, target geolocation(s), target marital status(es), target race(s), target ethnicity(ies), target nationality(ies), etc. of users targeted for distribution of the corresponding IMAP object. The campaign duration or other information in each IMAP object profile can define a timeframe during which the corresponding IMAP object should be visible.

Alternatively or additionally, it is possible to select IMAP objects to be injected depending on user preferences or opt in or opt out lists.

User interaction with the injected email objects (e.g. read, move, delete) can be easily detected and logged by the IMAP server because mail-IDs of the injected IMAP objects are known to the IMAP server and IMAP flags are synchronized with the MAIL client. These logs can afterwards be analyzed to determine information about, e.g., how often an IMAP object was read.

IMAP flags such as "seen" and "deleted", for injected IMAP objects, may be treated by the IMAP server in the same way as they are treated for regular emails.

Thus, the client experience for injected IMAP objects may in some embodiments be the same as it is for normally received emails.

Any injected IMAP object may have profile data, e.g., included in an IMAP object profile as indicated above, which describes in which case the IMAP object should be added to a user's IMAP folder. This makes it possible to determine a specific timeframe when the IMAP object should be injected, or a geolocation to determine where (in a geographical meaning) an IMAP object should be injected.

Any IMAP user account may have its own profile, referred to above as an IMAP user profile. Each IMAP user profile may be based on or include various user specific preferences, or the Class of Service he has purchased from the Email provider, which describes what kind of injected objects should be added to the IMAP folder to reflect specific user interests, or targeting specific user groups, or any of the other information described above.

In some embodiments, the IMAP server decides, based on the IMAP user profile and/or the IMAP object profiles, whether a given IMAP object is injected, or not.

Alternatively or additionally, in some embodiments, opt-in lists or opt-out lists are available which define which injectable IMAP objects (or which groups, types, classes, or categories of IMAP objects) should be injected, or not. Each entry in an opt-in list may define a corresponding injectable IMAP object (or group, type, class, or category of IMAP objects) which the user wants to be injected in the user's IMAP folder content list. Each entry in an opt-out list may define a corresponding injectable IMAP object (or group, type, class, or category of IMAP objects) which the user wants not to be injected in the user's IMAP folder content list.

Embodiments discussed herein are generally described as being implemented with the IMAP protocol. However, the disclosed embodiments may be adapted for implementation with virtually any messaging protocol or messaging architecture that retrieves IMAP folder content lists for MAIL clients and synchronizes the IMAP folder content lists with the MAIL clients. As an example, the embodiments described herein may be implemented with MICROSOFT'S Messaging Application Programming Interface (MAPI) messaging architecture.

Reference will now be made to the drawings to describe various aspects of some example embodiments of the invention. The drawings are diagrammatic and schematic representations of such example embodiments, and are not limiting of the present invention, nor are they necessarily drawn to scale.

Figure 1:
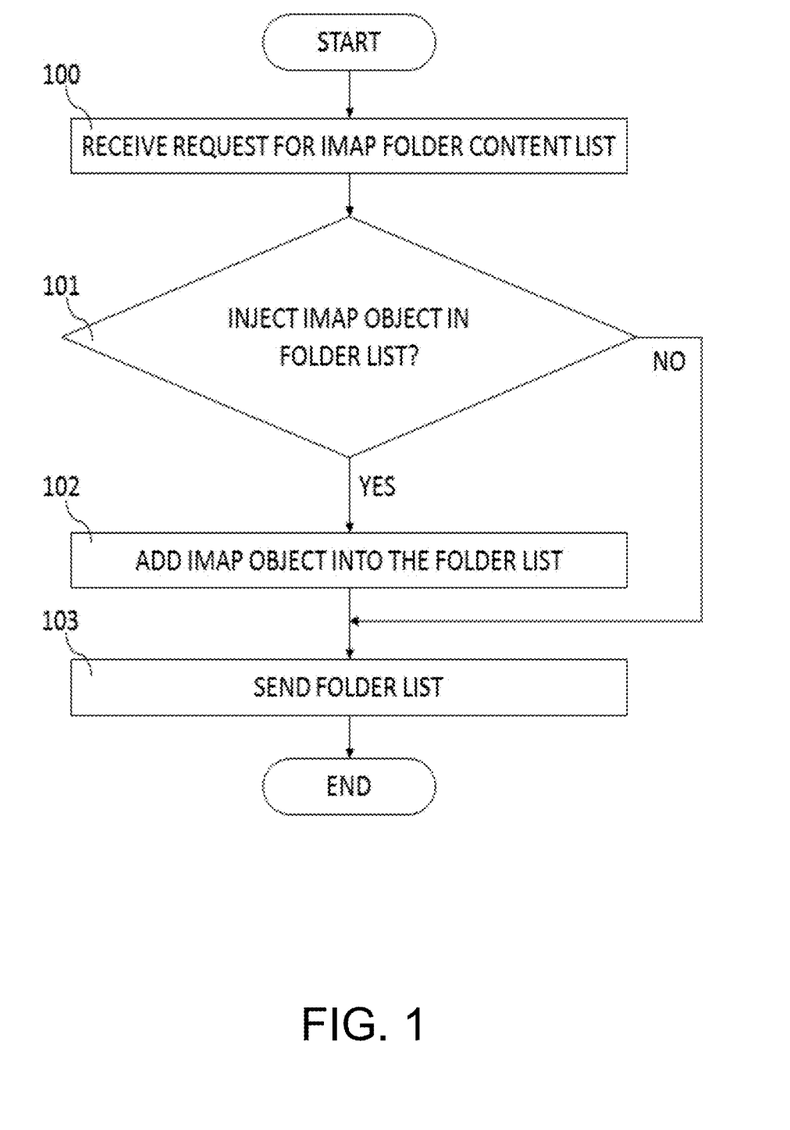
FIG. 1 is a flowchart of an example method for an IMAP server to receive and respond to a MAIL client's request for an IMAP folder content list for an IMAP user.

FIG. 1 is a flowchart of an example method for an IMAP server to receive and respond to a MAIL client's request for an IMAP folder content list for an IMAP user, arranged in accordance with at least one embodiment described herein. The method of FIG. 1 may be programmably performed or controlled by a processor in, e.g., a computer or server that includes an IMAP server. An example computing device that may correspond to the foregoing computer or server and that includes one or more processors that may perform or control performance of the method of FIG. 1 is described below with respect to FIG. 8.

In general, the MAIL client that may be executing on a client device of a user sends a request to the IMAP server for an IMAP folder content list of the user. The MAIL client sending the request may include the MAIL client sending a FETCH command to the IMAP server to receive a list of emails for a specific IMAP folder of the user, as identified by a user ID of the user that is included in the FETCH command. The method of FIG. 1 may begin at block 100.

In block 100 ["RECEIVE REQUEST FOR IMAP FOLDER CONTENT LIST"], the IMAP server receives the FETCH command (or more generally the request) from the MAIL client and starts processing the request. Block 100 may be followed by block 101.

Depending on the list of available injectable IMAP objects, object profiles for the injectable objects and/or user profiles, the IMAP server determines in block 101 ["INJECT IMAP OBJECT IN FOLDER LIST"] if any IMAP objects are to be injected into the users email list. Block 101 may be followed by block 102 ("YES" after block 101) or by block 103 ("NO" after block 101).

In block 102 ["ADD IMAP OBJECT INTO THE FOLDER LIST"], the IMAP server merges one or more injected IMAP objects into the user's email list. Depending on the list position, which can be defined by an IMAP object profile for the injectable IMAP object, the date header field is computed and modified in the resulting injected IMAP object to place the injected IMAP object at a position in the user's email list defined by the IMAP object profile. For instance, if the IMAP object profile defines a list position of the injectable IMAP object as a first or top position in the user's email list, the date header field may be computed and modified to be more recent than a date header field of a most recent email in the user's email list. As another example, if the IMAP object profile defines the list position of the injectable IMAP object as a tenth position in the user's email list, the date header field may be computed and modified to be temporally earlier than date header fields of first through ninth emails or other object in the user's email list, and temporally later than data header fields of all other emails a other objects in the user's email list. Block 102 may be followed by block 103.

In block 103 ["SEND FOLDER LIST"], the user's email list is sent to the MAIL client. The user's email list (or IMAP folder content list) may include both emails and one or more injected IMAP objects of one or more injected IMAP objects were added at block 102. The user's email list may include emails without including any IMAP objects if no IMAP objects were added at block 102.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 2:
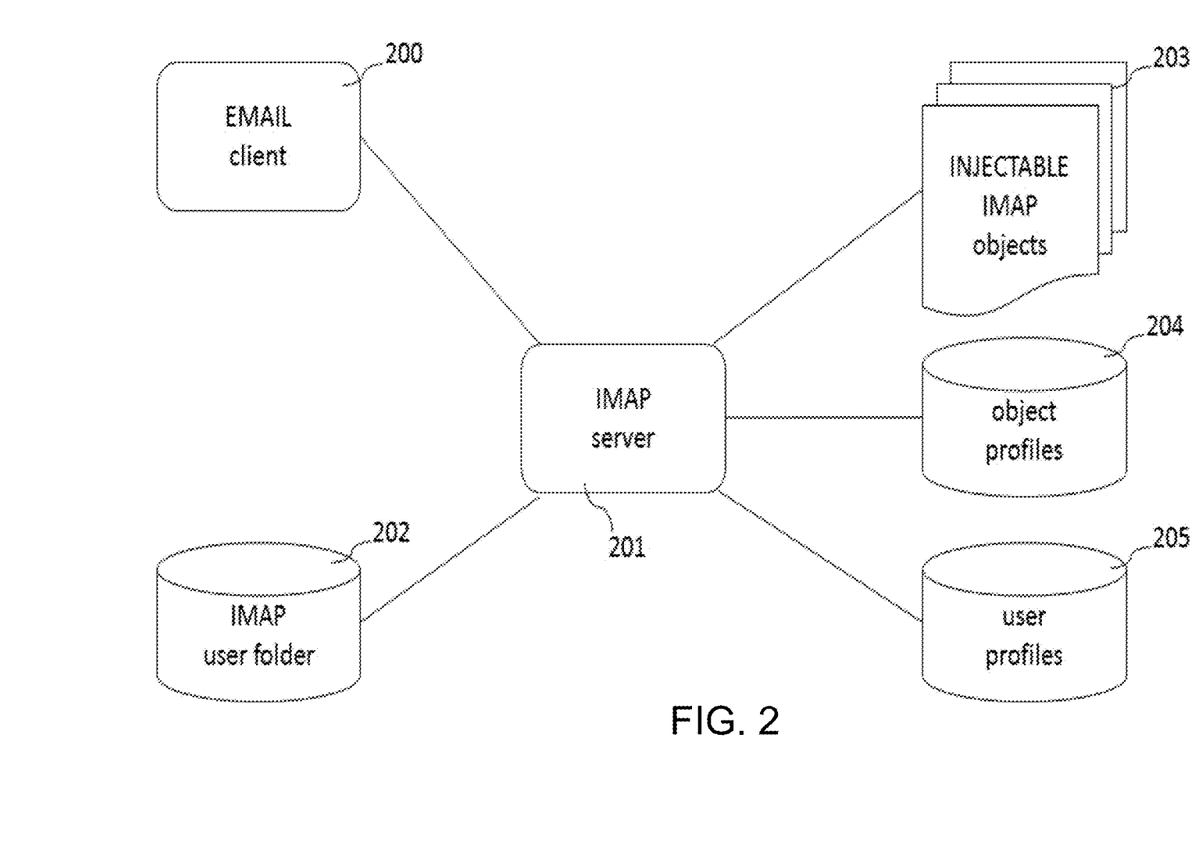
FIG. 2 is a block diagram of an example operating environment for an IMAP server that may perform the method of FIG. 1.

FIG. 2 is a block diagram of an example operating environment for an IMAP server 201, arranged in accordance with at least one embodiment described herein. The IMAP server 201 may implement the IMAP protocol with one or more of the additions and/or modifications described herein. For example, the IMAP server 201 may perform the method of FIG. 1 and/or one or more other methods described herein. One example implementation of the IMAP server 201 is described below with respect to FIG. 8.

The operating environment of FIG. 2 includes an email client 200, the IMAP server 201, an IMAP user folder 202, injectable IMAP objects 203, IMAP object profiles 204, and IMAP user profiles 205.

The email client 200 may include or correspond to the MAIL client discussed above and elsewhere herein and may be run (e.g., executed) on a client device of a user. The client device may include a desktop computer; a mobile device such as a smartphone, a tablet computer, a laptop computer, a personal digital assistant (PDA), an electronic reader device, or other mobile device; or other suitable client device. FIG. 2 illustrates a single email client 200. More generally, the operating environment may include multiple email clients 200 operating on the same or different client devices for one or more users. In some embodiments, a single user may have multiple client devices, each with a different email client 200, all of which can access the same IMAP user folder 202 through the IMAP server 201.

The IMAP user folder 202 may include a particular IMAP folder of a given user, linked to the given user by a user ID of the given user. Thus, when the IMAP server receives a request such as a FETCH command from the email client 200 that includes the user ID and identifies the IMAP user folder 202, the IMAP server 201 can find and read the IMAP user folder 202 (using the user ID and/or an identifier of the IMAP user folder 202) to prepare a corresponding IMAP folder content list to send to the email client 200 in response to the request. FIG. 2 illustrates a single IMAP user folder 202. More generally, the operating environment may include multiple IMAP user folders 202 for multiple users. A given user may have a single IMAP user folder 202 or multiple IMAP user folders 202 (e.g., inbox, sent, trash, daily deals, or other folders).

The injectable IMAP objects 203 may include multiple IMAP objects that can be injected into one or more user email lists of one or more users. The injectable IMAP objects 203 may each be stored in a single location (excluding backup and recovery copies) without ever being stored in any IMAP user folders 202. The single location may include a relational database or other structure stored on one or more non-transitory computer-readable media. Non-transitory computer-readable media includes, but is not limited to, RAM, ROM, EEPROM, flash memory or other memory technology, CD-ROM, solid state storage devices, digital versatile disks (DVD) or other optical storage, magnetic cassettes, magnetic tape, magnetic disk storage or other magnetic storage devices, or any other non-transitory medium which may be used to store computer-readable instructions.

Each of the injectable IMAP objects 203 may have, in the IMAP object profiles 204, a corresponding IMAP object profile. Each of the IMAP object profiles 204 may be specific or unique to a different one of the injectable IMAP objects 203.

Each of the users may have, in the IMAP user profiles 205, a corresponding IMAP user profile. Each of the IMAP user profiles 205 may be specific or unique to a different one of the users.

Although not illustrated in FIG. 2, the operating environment of FIG. 2 may further include a network that communicatively couples the email client 200, the IMAP server 201, the IMAP user folder 202, the injectable IMAP objects 203, the IMAP object profiles 204, and/or the IMAP user profiles 205 together. The network may include one or more wide area networks (WANs) and/or local area networks (LANs). In some embodiments, the network includes the Internet, including a global internetwork formed by logical and physical connections between multiple WANs and/or LANs. Alternately or additionally, the network may include one or more cellular RF networks and/or one or more wired and/or wireless networks such as, but not limited to, 802.xx networks, Bluetooth access points, wireless access points, IP-based networks, or the like. The network may also include servers that enable one type of network to interface with another type of network.

Briefly, in operation, the email client 200 sends a request to the IMAP server 201 to respond with a list of entries for a given IMAP folder and user ID. The IMAP server 201 reads the contents of the user's IMAP folder 202 and the list of available injectable IMAP objects 203, the IMAP object profiles 204 and the IMAP user profiles 205. The IMAP server 201 may filter the injectable IMAP objects 203 based on a match or matches between the IMAP object profiles 204 and the IMAP user profile 205 of the user whose email client 200 sent the request. Then the IMAP server 201 merges 201 one or more of the injectable IMAP objects 203 with the contents of the user's IMAP folder 202 and delivers the resulting list to the email client 200.

Figure 3:
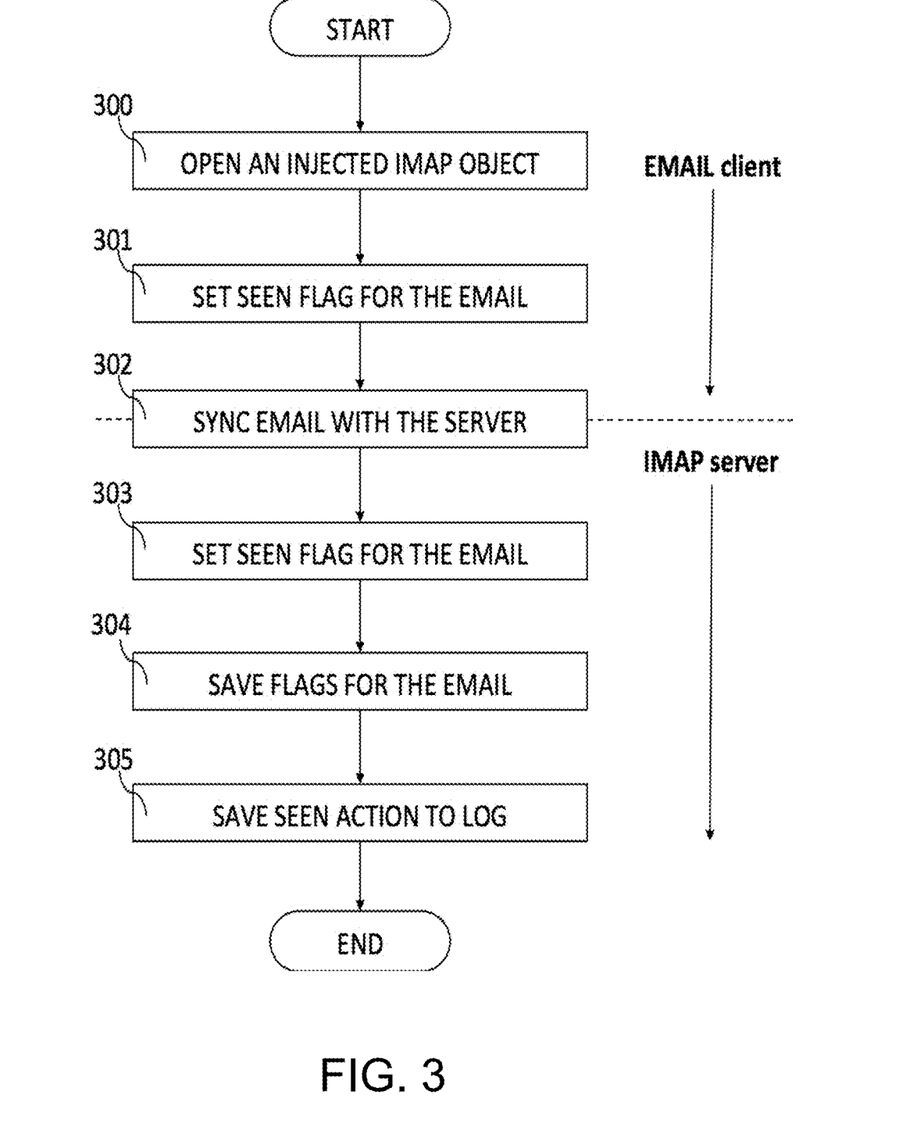
FIG. 3 is a flowchart of an example method to process flags for injected IMAP objects.

FIG. 3 is a flowchart of an example method to process flags for injected IMAP objects, arranged in accordance with at least one embodiment described herein. The method of FIG. 3 may be programmably performed or controlled by a processor in, e.g., the IMAP server 201 of FIG. 2 or other IMAP servers described herein. Alternatively or additionally, at least a portion of the method of FIG. 3 may be programmably performed or controlled by the email client 200 of FIG. 2 and/or by a processor in a client device on which the email client 200 is running. The method of FIG. 3 may begin at block 300.

In block 300 ["OPEN AN INJECTED IMAP OBJECT"], a user opens an injected IMAP object in the MAIL client. Block 300 may be followed by block 301.

In block 301 ["SET SEEN FLAG FOR THE EMAIL"], the MAIL client sets the IMAP seen flag for the injected IMAP object. Blocks 301 may be followed by block 302.

At block 302 ["SYNC EMAIL WITH THE SERVER"], the IMAP server syncs with the MAIL client. The IMAP server syncing with the MAIL client may include the IMAP server receiving data from the MAIL client that indicates the IMAP seen flag for the injected IMAP object has been set by the MAIL client (e.g., at the client device on which the MAIL client is running). Block 302 may be followed by block 303.

At block 303 ["SET SEEN FLAG FOR THE EMAIL"], the IMAP server sets the IMAP seen flag for the injected IMAP object. Block 303 may be followed by block 304.

At block 304 ["SAVE FLAGS FOR THE EMAIL"], the IMAP server saves the IMAP seen flag in its internal IMAP folder index. Block 304 may be followed by block 305.

At block 305 ["SAVE SEEN ACTION TO LOG"], the IMAP server saves an indication to a log file that the injected IMAP object was seen by the user.

The method of FIG. 3 is specific to an IMAP seen flag (and a seen action of the user). The method of FIG. 3 can be modified to apply to an IMAP delete flag (and a delete action of the user) or other IMAP flags (and associated actions). The log file can thereby record virtually any type of user interaction with IMAP objects that can be determined by the IMAP server, which information may be analyzed or processed to determine effectiveness, reach, or other information of IMAP objects.

Figure 4:
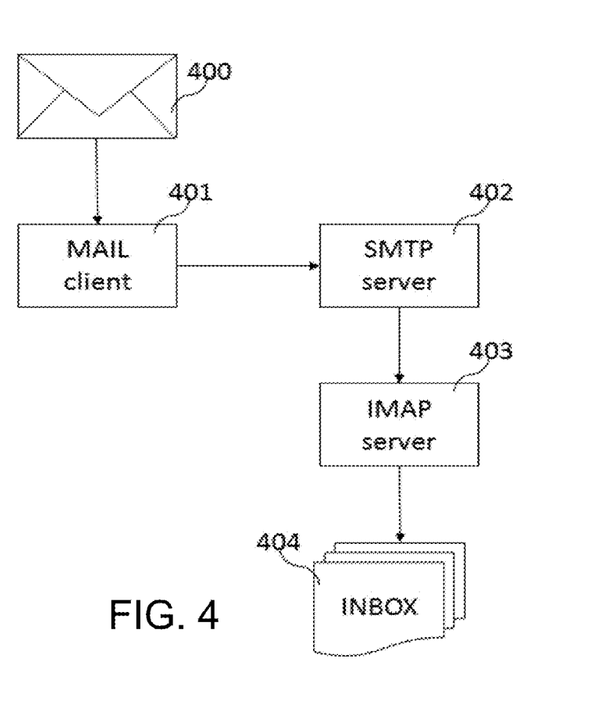
FIG. 4 is a flowchart that depicts how standard emails are sent by a MAIL client, received by a SMTP server and handed over to an IMAP server for storing in an inbox or other IMAP user folder of a recipient.

FIG. 4 is a flowchart that depicts how standard emails are sent by a MAIL client 401, received by the SMTP server 402 and handed over to the IMAP server 403 for storing in an inbox 404 or other IMAP user folder. The MAIL client 401 may include or correspond to the email client 200 of FIG. 2. The IMAP server 403 may include or correspond to the IMAP server 201 of FIG. 2.

In the example of FIG. 4, a user composes the email 400 and uses the MAIL client 401 to send the email 400 to a recipient (e.g., another user) that has the inbox 404 or other IMAP user folder. The recipient's SMTP server 402 receives the email 400 and stores it permanently to the recipient's inbox 404.

Figure 5:
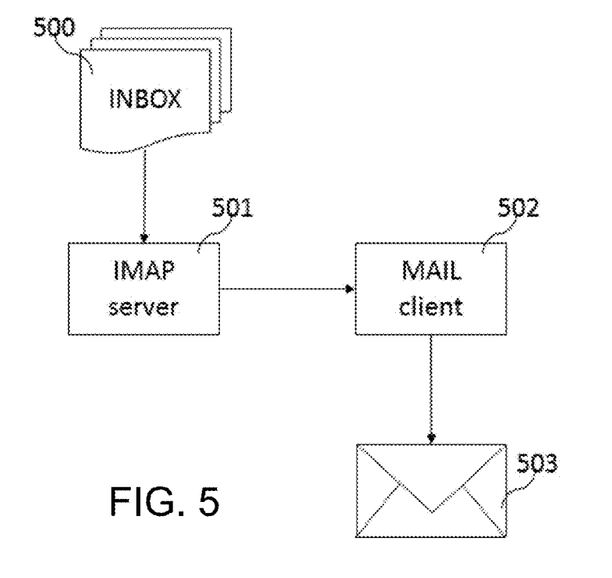
FIG. 5 is a flowchart that depicts how an email is brought to a MAIL client to display its contents to a user.

FIG. 5 is a flowchart that depicts how an email is brought to a MAIL client 501 to display its contents to a user. The MAIL client 501 may include or correspond to the email client 200 of FIG. 2.

In FIG. 5, when the user wants to read an email, the MAIL client 502 requests the contents of the email from an IMAP server 501. The IMAP server 501 may include or correspond to the IMAP server 201 of FIG. 2. The IMAP server 501 reads the contents of the email from an INBOX 500 of the user and sends the result to the user's MAIL client 502. The MAIL client 502 then displays the content of this email 503.

Figure 6:
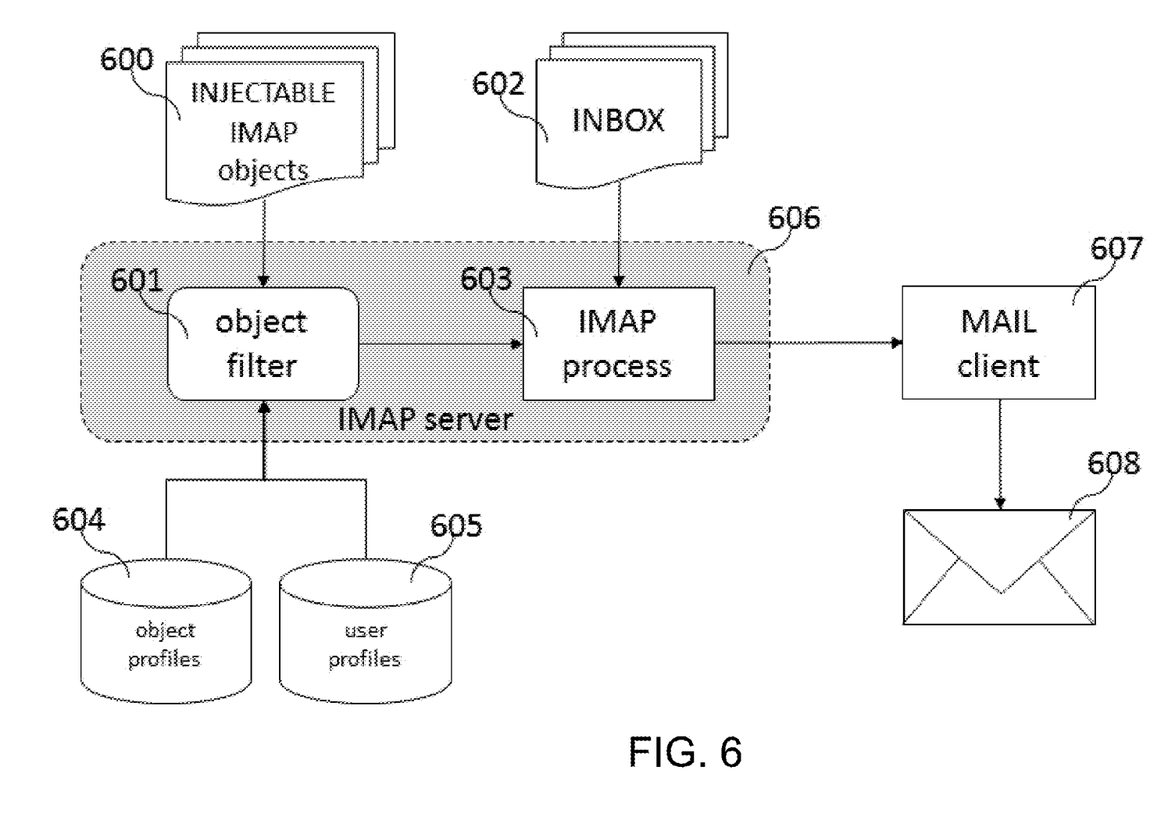

FIG. 6 is a diagram that depicts how injectable IMAP objects, which are not stored in a user's INBOX 602, can be injected ad-hoc as the user logs in, by the IMAP server 603, arranged in accordance with at least one embodiment described herein. The IMAP server 603 may include or correspond to the IMAP server 201 of FIG. 2.

The IMAP server 606 in FIG. 6 is displayed as one unit that includes an object filter 601 for adding injectable IMAP objects 600 and an IMAP process 603 to merge contents of the user's INBOX 602 with one or more IMAP objects from the list of injectable IMAP objects 600. The injectable IMAP objects 600 may include or correspond to the injectable IMAP objects 203 of FIG. 2. The user's INBOX 602 may include or correspond to the IMAP user folder 202 of FIG. 2.

In operation, a MAIL client 607 requests a list of emails of the user's INBOX 602 (or other IMAP user folder) from the IMAP server 606. The MAIL client 607 may include or correspond to the email client 200 of FIG. 2.

In response to the request, the object filter 601 collects (e.g., reads) the available injectable IMAP objects 600 and any available IMAP object profiles 604 and/or at least one of multiple IMAP user profiles 605. In some embodiments, a single one of the IMAP user profiles 605 is collected in response to the request, e.g., the IMAP user profile of the user identified by a user ID included in the request. Depending on the IMAP object profiles 604 and/or the IMAP user profiles 605, the object filter 601 filters the list of all injectable IMAP objects 600 down to a reduced list of one or more injectable IMAP objects and delivers it to the IMAP process 603.

The IMAP process 603 then merges the reduced list of one or more injectable IMAP objects received from the email filter 601 with the entries of the user's INBOX 602 and sends the merged list (with one or more injected IMAP objects) to the MAIL client 607. The MAIL client 607 displays to the user an enhanced inbox 608 that includes both the one or more injected IMAP objects and the entries of the user's INBOX 602.

Figure 7:
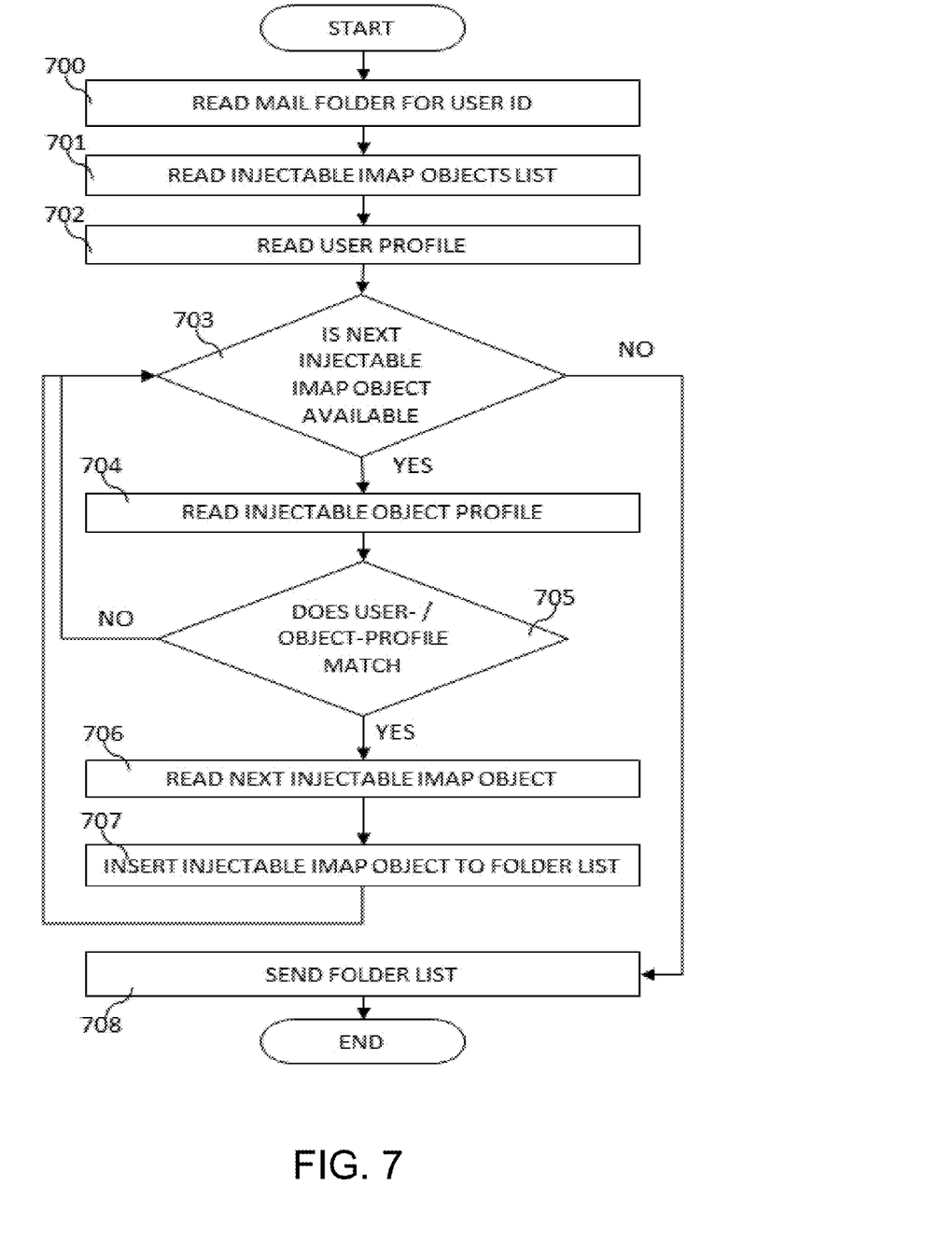
FIG. 7 is a flowchart of an example method to add IMAP objects to users' IMAP folder lists.

FIG. 7 is a flowchart of an example method to add IMAP objects to users' IMAP folder lists by an IMAP server, arranged in accordance with at least one embodiment described herein. The method of FIG. 7 may be programmably performed or controlled by a processor in, e.g., the IMAP server 201 of FIG. 2 or other IMAP servers described herein. The method of FIG. 7 may begin at block 700.

At block 700 ["READ MAIL FOLDER FOR USER ID"], the IMAP server reads the contents of an IMAP user folder for a given a user ID. The user ID may be included in a request for an IMAP folder content list of the IMAP user folder received from a client device and/or MAIL client of a user that has the user ID. Block 700 may be followed by block 701.

At block 701 ["READ INJECTABLE IMAP OBJECTS LIST"], the IMAP server reads a list of injectable IMAP objects, such as the injectable IMAP objects 203, 600 of FIGS. 2 and 6. Block 701 may be followed by block 702.

At block 702 ["READ USER PROFILE"], the IMAP server reads an IMAP user profile of the user with the given user ID. The IMAP user profile may include user-specific information about the user that can be used as constraints in determining which (if any) of the injectable IMAP objects to inject into the user's IMAP user folder. The user-specific information may include the user's geolocation, gender, categories of user interests, or other information. It is possible to define other, or more categories for the IMAP user profile of each user, or ignore any user profile if desired. Block 702 may be followed by block 703.

In block 703 ["IS NEXT INJECTABLE IMAP OBJECT AVAILABLE"], the IMAP server starts a processing loop over all available injectable IMAP objects and determines whether at least one IMAP object has not been processed. Block 703 may be followed by block 704 ("YES" at block 703) or by block 708 ("NO" at block 703).

At block 704 ["READ INJECTABLE OBJECT PROFILE"], and in response to at least one of the injectable IMAP objects being available (e.g., "YES" at block 703), the IMAP server reads the IMAP object profile data of the corresponding injectable IMAP object. Block 704 may be followed by block 705.

At block 705 ["DOES USER-/OBJECT-PROFILE MATCH"], the IMAP server determines whether there is a match of at least one criteria between the IMAP user profile of the user and the IMAP object profile of the current injectable IMAP object, or otherwise validates whether the IMAP object profile of the current injectable IMAP object fits to constraints which are defined in the IMAP user profile of the user. Blocks 700-705 may collectively form a subroutine to determine whether to inject any of multiple IMAP objects into an IMAP folder content list of a user. Block 705 may be followed by block 703 ("NO" at block 705) or by block 706 ("YES" at block 706).

At block 706 ["READ NEXT INJECTABLE IMAP OBJECT"], and in response to the IMAP user profile and the IMAP object profile matching (at least one criteria) (e.g., "YES" at block 705), the IMAP server reads the content of current injectable IMAP object. Block 706 may be followed by block 707.

At block 707 ["INSERT INJECTABLE IMAP OBJECT TO FOLDER LIST"], the current injectable IMAP object for which the match was determined at block 705 may be injected into the IMAP folder content list of the user. Injecting the current injectable IMAP object into the IMAP folder content list of the user may be accomplished by inserting metadata of the current injectable IMAP object into the IMAP folder content list of the user without inserting the current injectable IMAP object itself into the IMAP folder content list of the user. The metadata of the current injectable IMAP object may include one or more of a message UID that uniquely identifies the current injectable IMAP object, one or more flags associated with the current injectable IMAP object, or a pointer to the current injectable IMAP object (or wherever it is stored). Block 707 may be followed by block 703, which has already been described above.

When all of the injectable IMAP objects have been processed, e.g., no more are available in the list ("NO" at block 703), the method of FIG. 7 proceeds to block 708.

At block 708 ["SEND FOLDER LIST"], the IMAP folder content list that includes one or more injected IMAP objects may be sent to the client device and/or to the MAIL client running on the client device.

Figure 8:
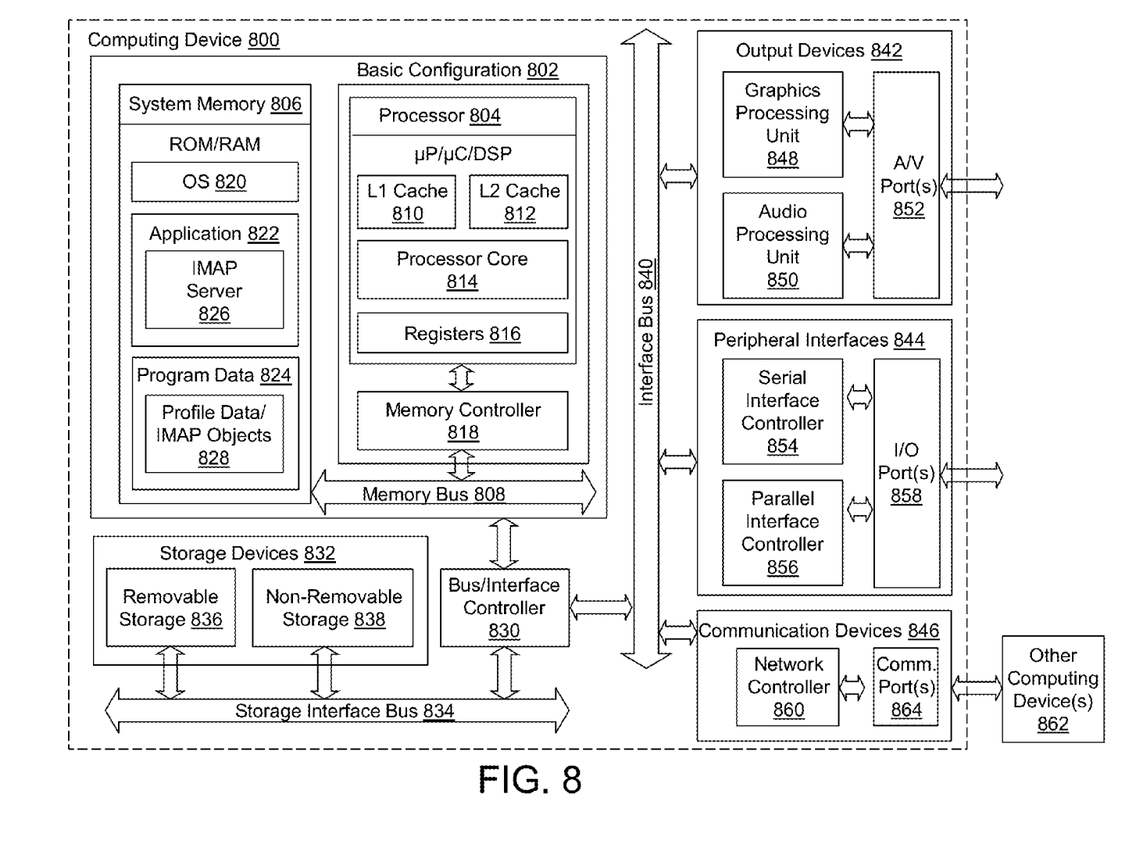
FIG. 8 is a block diagram illustrating an example computing device that is arranged to operate as an IMAP server.

FIG. 8 is a block diagram illustrating an example computing device 800 that is arranged to operate as an IMAP server, arranged in accordance with at least one embodiment described herein. In a basic configuration 802, the computing device 800 typically includes one or more processors 804 and a system memory 806. A memory bus 808 may be used to communicate between the processor 804 and the system memory 806.

Depending on the desired configuration, the processor 804 may be of any type including, but not limited to, a microprocessor (μP), a microcontroller (μc), a digital signal processor (DSP), or any combination thereof. The processor 804 may include one or more levels of caching, such as a level one cache 810 and a level two cache 812, a processor core 814, and registers 816. The processor core 814 may include an arithmetic logic unit (ALU), a floating point unit (FPU), a digital signal processing core (DSP Core), or any combination thereof. An example memory controller 818 may also be used with the processor 804, or in some implementations the memory controller 818 may include an internal part of the processor 804.

Depending on the desired configuration, the system memory 806 may be of any type including volatile memory (such as RAM), nonvolatile memory (such as ROM, flash memory, etc.), or any combination thereof. The system memory 806 may include an operating system 820, one or more applications 822, and program data 824. The application 822 may include an IMAP server 826 that is arranged to retrieve IMAP folder content lists for MAIL clients and synchronize the IMAP folder content lists with the MAIL clients, as described herein. The program data 824 may include profile data (e.g., IMAP object profiles and/or IMAP user profiles) and/or injectable IMAP objects as is described herein, or other IMAP data. In some embodiments, the application 822 may be arranged to operate with the program data 824 on the operating system 820 such that injection of IMAP objects and other methods may be provided as described herein.

The computing device 800 may have additional features or functionality, and additional interfaces to facilitate communications between the basic configuration 802 and any involved devices and interfaces. For example, a bus/interface controller 830 may be used to facilitate communications between the basic configuration 802 and one or more data storage devices 832 via a storage interface bus 834. The data storage devices 832 may be removable storage devices 836, non-removable storage devices 838, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer-readable instructions, data structures, program modules, or other data.

The system memory 806, the removable storage devices 836, and the non-removable storage devices 838 are examples of computer storage media or non-transitory computer-readable media. Computer storage media or non-transitory computer-readable media includes RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other non-transitory medium which may be used to store the desired information and which may be accessed by the computing device 800. Any such computer storage media or non-transitory computer-readable media may be part of the computing device 800.

The computing device 800 may also include an interface bus 840 to facilitate communication from various interface devices (e.g., output devices 842, peripheral interfaces 844, and communication devices 846) to the basic configuration 802 via the bus/interface controller 830. The output devices 842 include a graphics processing unit 848 and an audio processing unit 850, which may be configured to communicate to various external devices such as a display or speakers via one or more A/V ports 852. Diagrams, flowcharts, organizational charts, connectors, and/or other graphical objects generated by the diagram application 826 may be output through the graphics processing unit 848 to such a display. The peripheral interfaces 844 include a serial interface controller 854 or a parallel interface controller 856, which may be configured to communicate with external devices such as input devices (e.g., keyboard, mouse, pen, voice input device, touch input device, etc.), sensors, or other peripheral devices (e.g., printer, scanner, etc.) via one or more I/O ports 858. The communication devices 846 include a network controller 860, which may be arranged to facilitate communications with one or more other computing devices 862 over a network communication link via one or more communication ports 864.

The network communication link may be one example of a communication media. Communication media may typically be embodied by computer-readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term "computer-readable media" as used herein may include both storage media and communication media.

The computing device 800 may be implemented as a portion of a small-form factor portable (or mobile) electronic device such as a smartphone, a personal data assistant (PDA) or an application-specific device. The computing device 800 may also be implemented as a personal computer including tablet computer, laptop computer, and/or non-laptop computer configurations, or a server computer including both rack-mounted server computer and blade server computer configurations.

In view of the foregoing, various embodiments that can be implemented independently or together will now be described. In an example embodiment, a method to temporarily inject IMAP objects into one or more IMAP folders corresponding to one or more users, using a special IMAP server capability, is described. The method includes storing each of the IMAP objects in corresponding data containers without storing the IMAP objects in any of the one or more IMAP folders. The method also includes temporarily injecting a particular one of the IMAP objects into each of the one or more IMAP folders by temporarily injecting, in response to one or more FETCH commands received from one or more MAIL clients, metadata of the particular one of the IMAP objects into each of one or more IMAP folder content lists of the one or more IMAP folders without storing the particular one of the IMAP objects itself in any of the one or more IMAP folders.

Alternatively or additionally, the temporarily inserting metadata of the particular one of the IMAP objects into each of the one or more IMAP folder content lists includes temporarily inserting into each of the one or more IMAP folder content lists a message UID that uniquely identifies the particular one of the IMAP objects, one or more flags associated with the particular one of the IMAP objects, and a pointer to the particular one of the IMAP objects.

Alternatively or additionally, the method may further include filtering the IMAP objects based on at least one of: one or more IMAP user profiles, one each associated with each of the one or more users; IMAP object profiles associated with the IMAP objects; or opt-in and opt-out lists. The method may also include identifying for injection, based on the filtering, the particular one of the IMAP objects from among all of the IMAP objects prior to temporarily injecting the particular one of the IMAP objects into each of the one or more IMAP folders.

Alternatively or additionally, storing each of the IMAP objects may include storing each of multiple advertising messages and/or each of multiple informational messages.

In another example embodiment, a method includes receiving, from a client device associated with a given user of multiple users, a request for an IMAP folder content list of an IMAP user folder of the given user. The method may also include determining whether to inject any of multiple IMAP objects into the IMAP folder content list of the given user. The method may also include, in response to determining to inject a given IMAP object of the multiple IMAP objects into the IMAP folder content list of the given user, injecting the given IMAP object into the IMAP folder content list of the given user by inserting metadata of the given IMAP object into the IMAP folder content list of the given user without storing the given IMAP object itself in the given user's IMAP user folder. The method may also include sending to the client device of the given user the IMAP folder content list that includes the injected given IMAP object.

Alternatively or additionally, the method may further include storing the multiple IMAP objects on a non-transitory computer-readable medium without storing the multiple IMAP objects in any of multiple IMAP folders corresponding to the multiple users, including storing the multiple IMAP objects in a relational database on the non-transitory computer-readable medium.

Alternatively or additionally, the method may further include syncing with the client device of the given user, including receiving data from the client device that indicates a seen flag of the given IMAP object is set at the client device. The method may also include setting, by an IMAP server, a seen flag of the given IMAP object for the given user. The method may also include saving an indication to a log file that the given IMAP object was seen by the given user.

Alternatively or additionally, determining whether to inject any of the multiple IMAP objects into the IMAP folder content list of the given user may include determining whether to inject any of the multiple IMAP objects into the IMAP folder content list of the given user based on at least one of: an IMAP user profile of the given user; multiple IMAP object profiles, one each associated with each of the IMAP objects; or opt-in and opt-out lists.

Alternatively or additionally, determining whether to inject any of the multiple IMAP objects into the IMAP folder content list of the given user may include: reading an IMAP folder of the given user identified by a given user ID associated with the given user and included in the request from the client device; reading a list of the multiple IMAP objects; reading the IMAP user profile of the given user; for each of the multiple IMAP objects, reading a corresponding one of the multiple IMAP object profiles and determining whether there is a match between the IMAP user profile and the corresponding one of the multiple IMAP object profiles; and determining to inject the given IMAP object in response to determining that there is a match between the IMAP user profile of the given user and one of the multiple IMAP object profiles that is associated with the given IMAP object.

Alternatively or additionally, the method may further include injecting the given IMAP object into multiple IMAP folder content lists of multiple IMAP user folders, one each associated with each of the multiple users, by inserting the metadata of the given IMAP object into each of the multiple IMAP folder content lists without storing the given IMAP object itself in any of the multiple IMAP user folders.

Alternatively or additionally, inserting the metadata of the given IMAP object into the multiple IMAP folder content lists without storing the given IMAP object itself in any of the multiple IMAP user folders includes inserting multiple pointers in the multiple IMAP folder content lists, including inserting one pointer into each of the multiple IMAP folder content lists, wherein the multiple pointers point to a single instance of the given IMAP object.

Alternatively or additionally, injecting the given IMAP object into the multiple IMAP folder content lists includes injecting the given IMAP object into the multiple IMAP folder content lists without sending the given IMAP object to the multiple users through a SMTP server.

Alternatively or additionally, the method further includes receiving in succession multiple requests for the IMAP folder content list of the given user. The method may also include injecting the given IMAP object into a same numerical message position in the IMAP folder content list of the given user in response to each of the multiple requests notwithstanding addition, after a first injection of the given IMAP object into the IMAP folder content list of the given user, of at least one new email message into the IMAP folder content list of the given user.

Alternatively or additionally, the method may further include removing the given IMAP object from the IMAP folder content list of the given user after expiration of the given IMAP object independent of any input of the given user with respect to the give IMAP object.

Alternatively or additionally, the method may further include: syncing with the client device of the given user, including receiving data from the client device that indicates the given IMAP object was deleted or moved by the given user at the client device; and saving an indication to a log file that the given IMAP object was deleted or moved by the given user.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media.

Computer-executable instructions may include, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general-purpose hardware), specific hardware implementations or a combination of software and specific hardware implementations are also possible and contemplated. In this description, a "computing entity" may be any computing system as previously defined herein, or any module or combination of modulates running on a computing system.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method to temporarily inject Internet Message Access Protocol (IMAP) objects into one or more IMAP folders corresponding to one or more users, using a special IMAP server capability, the method comprising:
   storing, by a computing device, each of the IMAP objects in corresponding data containers without storing the IMAP objects in any of the one or more IMAP folders;
   temporarily injecting, by the computing device, a particular one of the IMAP objects into each of the one or more IMAP folders by temporarily inserting, in response to one or more FETCH commands received from one or more MAIL clients, metadata of the particular one of the IMAP objects into each of one or more IMAP folder content lists of the one or more IMAP folders without storing the particular one of the IMAP objects itself in any of the one or more IMAP folders;
   filtering the IMAP objects based on at least one of:
      one or more IMAP user profiles, one each associated with each of the one or more users;
      IMAP object profiles associated with the IMAP objects; or
      opt-in and opt-out lists; and
   identifying for injection, based on the filtering, the particular one of the IMAP objects from among all of the IMAP objects prior to temporarily injecting the particular one of the IMAP objects into each of the one or more IMAP folders.

2. The method of claim 1, wherein the temporarily inserting metadata of the particular one of the IMAP objects into each of the one or more IMAP folder content lists includes temporarily inserting into each of the one or more IMAP folder content lists a message unique identifier (UID) that uniquely identifies the particular one of the IMAP objects, one or more flags associated with the particular one of the IMAP objects, and a pointer to the particular one of the IMAP objects.

3. The method of claim 1, wherein storing each of the IMAP objects comprises storing each of multiple advertising messages.

4. The method of claim 1, wherein storing each of the IMAP objects comprises storing each of multiple informational messages.

5. A non-transitory computer-readable medium having computer-readable instructions stored thereon that are executable by a processing device to perform or control performance of the method of claim 1.

6. A method, comprising:
   receiving, from a client device associated with a given user of multiple users, a request for an Internet Message Access Protocol (IMAP) folder content list of an IMAP user folder of the given user;
   determining whether to inject any of multiple IMAP objects into the IMAP folder content list of the given user;
   in response to determining to inject a given IMAP object of the multiple IMAP objects into the IMAP folder content list of the given user, injecting the given IMAP object into the IMAP folder content list of the given user by inserting metadata of the given IMAP object into the IMAP folder content list of the given user without storing the given IMAP object itself in the given user's IMAP user folder;
   sending to the client device of the given user the IMAP folder content list that includes the injected given IMAP object; and
   injecting the given IMAP object into multiple IMAP folder content lists of multiple IMAP user folders, one each associated with each of the multiple users, by inserting the metadata of the given IMAP object into each of the multiple IMAP folder content lists without storing the given IMAP object itself in any of the multiple IMAP user folders.

7. The method of claim 6, further comprising storing the multiple IMAP objects on a non-transitory computer-readable medium without storing the multiple IMAP objects in any of multiple IMAP folders corresponding to the multiple users, including storing the multiple IMAP objects in a relational database on the non-transitory computer-readable medium.

8. The method of claim 6, further comprising:
syncing with the client device of the given user, including receiving data from the client device that indicates a seen flag of the given IMAP object is set at the client device;
setting, by an IMAP server, a seen flag of the given IMAP object; and
saving an indication to a log file that the given IMAP object was seen by the given user.

9. The method of claim 6, wherein determining whether to inject any of the multiple IMAP objects into the IMAP folder content list of the given user includes determining whether to inject any of the multiple IMAP objects into the IMAP folder content list of the given user based on at least one of:
an IMAP user profile of the given user;
multiple IMAP object profiles, one each associated with each of the IMAP objects; or
opt-in and opt-out lists.

10. The method of claim 9, wherein determining whether to inject any of the multiple IMAP objects into the IMAP folder content list of the given user includes:
reading an IMAP folder of the given user identified by a given user identifier (ID) associated with the given user and included in the request from the client device;
reading a list of the multiple IMAP objects;
reading the IMAP user profile of the given user;
for each of the multiple IMAP objects, reading a corresponding one of the multiple IMAP object profiles and determining whether there is a match between the IMAP user profile and the corresponding one of the multiple IMAP object profiles; and
determining to inject the given IMAP object in response to determining that there is a match between the IMAP user profile of the given user and one of the multiple IMAP object profiles that is associated with the given IMAP object.

11. The method of claim 6, wherein inserting the metadata of the given IMAP object into the multiple IMAP folder content lists without storing the given IMAP object itself in any of the multiple IMAP user folders includes inserting multiple pointers in the multiple IMAP folder content lists, including inserting one pointer into each of the multiple IMAP folder content lists, wherein the multiple pointers point to a single instance of the given IMAP object.

12. The method of claim 6, wherein injecting the given IMAP object into the multiple IMAP folder content lists includes injecting the given IMAP object into the multiple IMAP folder content lists without sending the given IMAP object to the multiple users through a Simple Mail Transfer Protocol (SMTP) server.

13. The method of claim 6, further comprising:
receiving in succession multiple requests for the IMAP folder content list of the given user;
injecting the given IMAP object into a same numerical message position in the IMAP folder content list of the given user in response to each of the multiple requests notwithstanding addition, after a first injection of the given IMAP object into the IMAP folder content list of the given user, of at least one new email message into the IMAP folder content list of the given user.

14. The method of claim 13, further comprising removing the given IMAP object from the IMAP folder content list of the given user after expiration of the given IMAP object independent of any input of the given user with respect to the give IMAP object.

15. The method of claim 6, further comprising:
syncing with the client device of the given user, including receiving data from the client device that indicates the given IMAP object was deleted or moved by the given user at the client device; and
saving an indication to a log file that the given IMAP object was deleted or moved by the given user.

16. A non-transitory computer-readable medium having computer-readable instructions stored thereon that are executable by a processing device to perform or control performance of operations comprising:
receiving, from a client device associated with a given user of multiple users, a request for an Internet Message Access Protocol (IMAP) folder content list of an IMAP user folder of the given user;
determining whether to inject any of multiple IMAP objects into the IMAP folder content list of the given user;
in response to determining to inject a given IMAP object of the multiple IMAP objects into the IMAP folder content list of the given user, injecting the given IMAP object into the IMAP folder content list of the given user by inserting metadata of the given IMAP object into the IMAP folder content list of the given user without storing the given IMAP object itself in the given user's IMAP user folder;
sending to the client device of the given user the IMAP folder content list that includes the injected given IMAP object; and
injecting the given IMAP object into multiple IMAP folder content lists of multiple IMAP user folders, one each associated with each of the multiple users, by inserting the metadata of the given IMAP object into each of the multiple IMAP folder content lists without storing the given IMAP object itself in any of the multiple IMAP user folders.

17. The non-transitory computer-readable medium of claim 16, wherein determining whether to inject any of the multiple IMAP objects into the IMAP folder content list of the given user includes:
reading an IMAP folder of the given user identified by a given user identifier (ID) associated with the given user and included in the request from the client device;
reading a list of the multiple IMAP objects;
reading an IMAP user profile of the given user;
for each of the multiple IMAP objects, reading a corresponding one of multiple IMAP object profiles and determining whether there is a match between the IMAP user profile and the corresponding one of the multiple IMAP object profiles; and
determining to inject the given IMAP object in response to determining that there is a match between the IMAP user profile of the given user and one of the multiple IMAP object profiles that is associated with the given IMAP object.

\* \* \* \* \*

UNITED STATES PATENT AND TRADEMARK OFFICE
CERTIFICATE OF CORRECTION

PATENT NO. : 9,531,785 B1  
APPLICATION NO. : 15/184746  
DATED : December 27, 2016  
INVENTOR(S) : Linnamäki et al.

Page 1 of 2

It is certified that error appears in the above-identified patent and that said Letters Patent is hereby corrected as shown below:

In the Specification

In Column 6, Line 33, delete "data header" and insert -- date header --, therefor.

In Column 6, Lines 33-34, delete "a other" and insert -- and other --, therefor.

In Column 8, Line 32, delete "Blocks 301" and insert -- Block 301 --, therefor.

In Column 9, Line 6, delete "MAIL client 501" and insert -- MAIL client 502 --, therefor.

In Column 9, Line 7, delete "MAIL client 501" and insert -- MAIL client 502 --, therefor.

In Column 9, Line 19, delete "IMAP server 603," and insert -- IMAP server 606, --, therefor.

In Column 9, Line 21, delete "IMAP server 603" and insert -- IMAP server 606 --, therefor.

In Column 9, Line 54, delete "inbox 608" and insert -- email 608 --, therefor.

In Column 10, Line 42, delete "block 706)." and insert -- block 705). --, therefor.

In Column 11, Line 15, delete "(μc)," and insert -- (μC), --, therefor.

In Column 12, Line 19, delete "application 826" and insert -- application 822 --, therefor.

In Column 12, Line 49, delete "data" and insert -- digital --, therefor.

In Column 14, Line 50, delete "give" and insert -- given --, therefor.

Signed and Sealed this  
Twentieth Day of June, 2017

Joseph Matal  
*Performing the Functions and Duties of the*  
*Under Secretary of Commerce for Intellectual Property and*  
*Director of the United States Patent and Trademark Office*

In the Claims

In Column 18, Line 7, in Claim 14, delete "give" and insert -- given --, therefor.